Dec. 9, 1941.  O. E. KOEHLER  2,265,238
TOOL CHUCK
Filed April 6, 1938
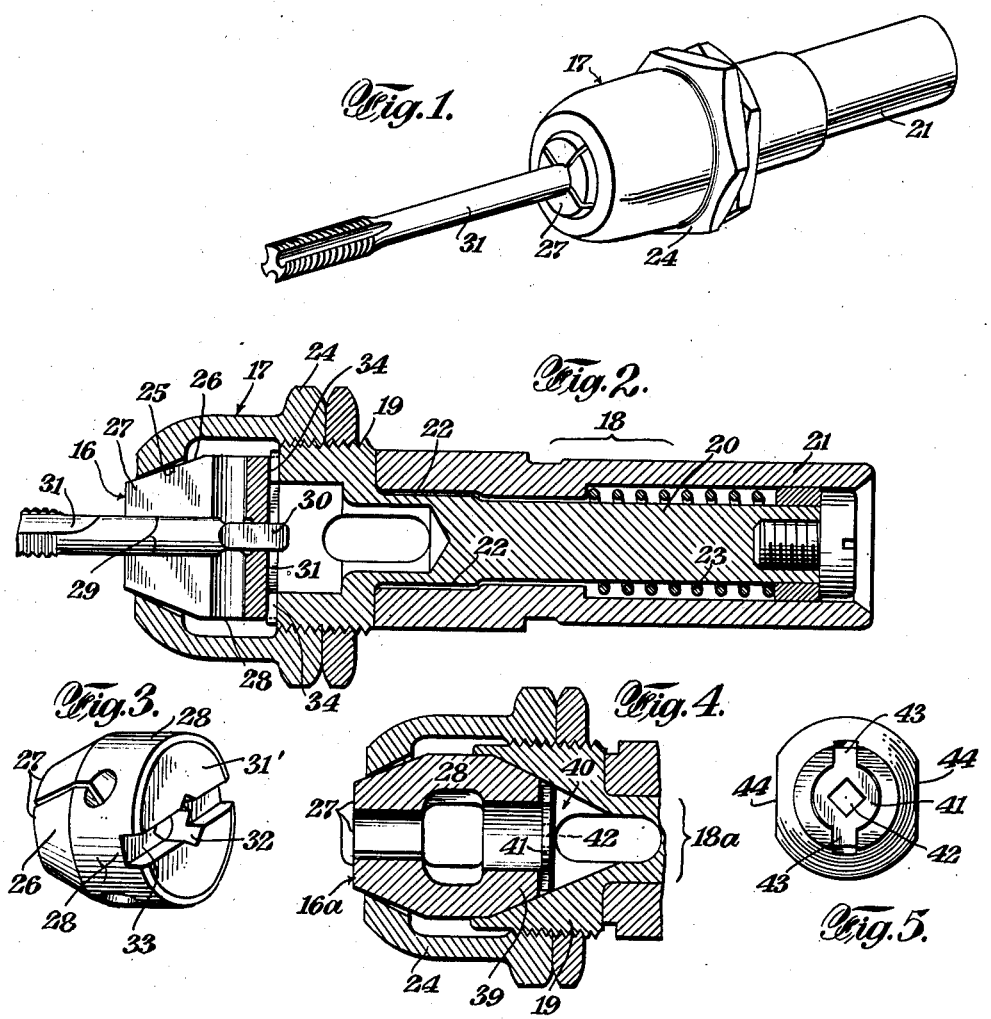
INVENTOR
Oscar E. Koehler
BY
Edwards, Bower & Pool
ATTORNEYS Patented Dec. 9, 1941

2,265,238

UNITED STATES PATENT OFFICE 2,265,238

TOOL CHUCK

Oscar E. Koehler, Greenfield, Mass., assignor to Greenfield Tap and Die Corporation, Greenfield, Mass., a corporation of Massachusetts Application April 6, 1938, Serial No. 200,365

1 Claim. (Cl. 279—49)

This invention relates to improvements in chucks for taps and similar tools having shaped ends adapted to fit into a socket to prevent the tool from turning in the chuck.

An object of the invention is to utilize a chuck provided with an interchangeable jaw unit of the acorn or tapered type removably held on a suitable body by a jaw actuating cap, and to provide in such an arrangement an integral jaw unit provided with a suitable socket for the tap shank.

A further purpose is to provide an arrangement that is simple, compact and strong, easily constructed and operated, and which may be made from any desired type of metal.

Other purposes including the particular construction, arrangement and combination of parts will appear from the following description considered in connection with the accompanying drawing in which, Fig. 1 is a perspective view of a chuck with a tap held therein;

Fig. 2 is an enlarged longitudinal central section through Fig. 1;

Fig. 3 is a perspective view of the jaw unit;

Fig. 4 is an enlarged fragmentary section similar to Fig. 2 showing a modified form; and Fig. 5 is a rear view from the end of the jaw unit of Fig. 4 removed.

In the preferred form illustrated the invention is applied to a type of holder including a jaw unit 16, a retaining cap 17 and a body 18 heretofore known in connection with tapered or acorn threading dies, one form being illustrated in the patent to Koehler, No. 1,945,906. The body 18 may be of the type permitting longitudinal movement between the work and the holder, the form illustrated employing a threaded head 19 and an extension 20 longitudinally slidable in tubular shank 21, the shank and extension being provided with registering flat driving faces 22, and yieldably held in contracted position by spring 23 engaging shoulders on the shank and extension. Cap 24 is threaded on body head 19 and has a tapered bore 25 engaging the tapered outer faces 26 of jaws 27 of the jaw unit 16. Jaws 27 are mounted on a body 28 which is provided with a socket registering with the inner faces 29 of jaws 27 and adapted to fit the shaped tip 30 of tap 31 or the like passing between jaws 27. This is preferably accomplished by providing an arrangement integral with body 28 and jaws 27, the form shown having a wall 31' extending across the unit 16 and provided with a socket 32 positioned to fit the tip 30 when gripped by jaws 27. The lower portion of body 28 and wall 31' may be provided with a suitable transverse groove 33 fitting over appropriate lugs 34 on the end of body 18.

Another arrangement is illustrated in Fig. 4, in which the jaw unit 16a is provided with a tapered inner end 39 fitting into a tapered recess 40 in the end of body 18a. The sides of the jaw unit have flat portions 44 fitting similar flat inner surfaces of the threaded head 19. With this construction the socket for the shank tip 30 may be in the form of a separate driver plate 41 provided with a shank-engaging recess 42 and with tongues 43 floatingly fitting in suitable grooves in the end of the jaw unit (Figs. 4 and 5).

In operation the same body 18 and cap 17 may be used to hold a wide range of jaw units 16 constructed to fit taps 31 or the like of a standard range of sizes of shank and tip, the tap being readily clamped in position by screwing down cap 17 and being held against possible rotation in jaws 27 by the engagement of the shank tip 30 with an appropriate socket.

While the preferred form of the invention has been shown, together with certain modifications, it will be apparent that other changes in the construction and arrangement may be made within the scope of the invention as set forth by the claims.

I claim:

A tool chuck comprising a jaw unit with flexible gripping jaws, a shank having a hollow threaded head engaging said jaw unit positively to turn said unit with said head, a cap threaded on said head and engaging said jaws to grip them against the shank of a tool, grooves in the shank engaged portion of said jaw unit, and a separate driver plate having a central portion provided with a central orifice fitting the angular end of a tool to turn the same and having projections floatingly fitting in said grooves of said jaw unit to provide automatic centering of the tool in the jaws whereby the turning torque is applied from said shank head to said jaw unit and from said jaw unit to said driver plate and from said driver plate to the tool centered in said jaws.

OSCAR E. KOEHLER.